(12) United States Patent
Yoshida et al.

(10) Patent No.: US 7,599,258 B2
(45) Date of Patent: Oct. 6, 2009

(54) INFORMATION RECORDING MEDIUM, AND INFORMATION RECORDING APPARATUS AND METHOD

(75) Inventors: Masayoshi Yoshida, Tokorozawa (JP); Takeshi Koda, Tokorozawa (JP); Keiji Katata, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 1212 days.

(21) Appl. No.: 10/891,123

(22) Filed: Jul. 15, 2004

(65) Prior Publication Data

US 2005/0013591 A1    Jan. 20, 2005

(30) Foreign Application Priority Data

Jul. 15, 2003  (JP)  ............................. 2003-197334

(51) Int. Cl.
  *G11B 7/00*  (2006.01)
(52) U.S. Cl. ..................................... 369/47.1; 369/53.1
(58) Field of Classification Search ............. 369/53.22, 369/275.3, 47.1, 47.27, 53.42, 53.12, 53.1
  See application file for complete search history.

(56) References Cited

U.S. PATENT DOCUMENTS 5,625,611 A * 4/1997 Yokota et al. ............ 369/47.12

FOREIGN PATENT DOCUMENTS

| JP | 5041022 | 2/1993 |
|----|---------|--------|
| JP | 6282386 | 10/1994 |
| JP | 6309210 | 11/1994 |
| JP | 7-44431 | 2/1995 |
| JP | 7044431 | 2/1995 |
| JP | 9-167447 | 6/1997 |
| JP | 10-177769 | 6/1998 |
| JP | 11-086418 | 3/1999 |
| JP | 11-126436 | 5/1999 |
| JP | 2001-266496 | 9/2001 |

* cited by examiner

*Primary Examiner*—Nabil Z Hindi
(74) *Attorney, Agent, or Firm*—Young & Thompson

(57) ABSTRACT

An information recording medium is provided with: a recording area divided into a plurality of partial areas; and an information area for recording therein (i) management information for managing recording conditions of the plurality of partial areas at least for each of the plurality of partial areas and (ii) reliability information for indicating reliability of the management information for each of the plurality of partial areas.

11 Claims, 13 Drawing Sheets

| Head and Tail Addresses of Sector in Each Block | Space Bit Map Info. (recorded 1, unrecorded 0) | P-Area Name | Reliability Map Info. Reliability Flag (Newest 0, Not Newest 1) |
|---|---|---|---|
| 20000 ~ 2FFFF | 1 | | |
| 30000 ~ 3FFFF | 1 | | |
| 40000 ~ 4FFFF | 1 | LI-1 | 0 |
| 50000 ~ 5FFFF | 1 | | |
| 60000 ~ 6FFFF | 1 | | |
| 70000 ~ 7FFFF | 1 | | |
| 80000 ~ 8FFFF | 1 | | |
| 90000 ~ 9FFFF | 1 | LI-2 | 0 |
| A0000 ~ AFFFF | 0 | | |
| B0000 ~ BFFFF | 0 | | |
| C0000 ~ CFFFF | 0 | | |
| D0000 ~ DFFFF | 0 | | |
| E0000 ~ EFFFF | 0 | LI-3 | 1 |
| F0000 ~ FFFFF | 1 | | |
| 100000 ~ 10FFFF | x0 | | |
| : | : | : | : |
| : | : | : | : |
| 4D0000 ~ 4DFFFF | 1 | | |
| 4E0000 ~ 4EFFFF | 1 | | |
| 4F0000 ~ 4FFFF | 1 | LO-2 | 0 |
| 500000 ~ 50FFFF | 1 | | |
| 510000 ~ 51FFFF | 1 | | |

FIG. 4

| Head and Tail Addresses of Sector in Each Block | Space Bit Map Info. (recorded 1, unrecorded 0) | P-Area Name | Reliability Map Info. Reliability Flag (Newest 0, Not Newest 1) |
|---|---|---|---|
| 20000 ~ 2FFFF | 1 | LI-1 | 0 |
| 30000 ~ 3FFFF | 1 | | |
| 40000 ~ 4FFFF | 1 | | |
| 50000 ~ 5FFFF | 1 | | |
| 60000 ~ 6FFFF | 1 | | |
| 70000 ~ 7FFFF | 1 | LI-2 | 0 |
| 80000 ~ 8FFFF | 1 | | |
| 90000 ~ 9FFFF | 1 | | |
| A0000 ~ AFFFF | 0 | | |
| B0000 ~ BFFFF | 0 | | |
| C0000 ~ CFFFF | 0 | LI-3 | 1 |
| D0000 ~ DFFFF | 0 | | |
| E0000 ~ EFFFF | 0 | | |
| F0000 ~ FFFFF | 1 | | |
| 100000 ~ 10FFFF | x0 | | |
| ⋮ | ⋮ | ⋮ | ⋮ |
| 4D0000 ~ 4DFFFF | 1 | LO-2 | 0 |
| 4E0000 ~ 4EFFFF | 1 | | |
| 4F0000 ~ 4FFFF | 1 | | |
| 500000 ~ 50FFFF | 1 | | |
| 510000 ~ 51FFFF | 1 | | |

FIG. 6

| Head and Tail Addresses of Sector in Each Block | Space Bit Map Info. (recorded 1, unrecorded0) | P-Area Name | Reliability Flag (Updated 0, Not Updated 1) |
|---|---|---|---|
| 20000 ~ 2FFFF | 1 | | |
| 30000 ~ 3FFFF | 1 | | |
| 40000 ~ 4FFFF | 1 | | |
| 50000 ~ 5FFFF | 1 | | |
| 60000 ~ 6FFFF | 1 | | |
| 70000 ~ 7FFFF | 1 | | |
| 80000 ~ 8FFFF | 1 | | |
| 90000 ~ 9FFFF | 1 | | |
| A0000 ~ AFFFF | 0 | | |
| B0000 ~ BFFFF | 0 | | |
| C0000 ~ CFFFF | 0 | | |
| D0000 ~ DFFFF | 0 | | |
| E0000 ~ EFFFF | 0 | ENTIRE AREA | 1 |
| F0000 ~ FFFFF | 1 | | |
| 100000 ~ 10FFFF | x0 | | |
| ⋮ | ⋮ | | |
| 4D0000 ~ 4DFFFF | 1 | | |
| 4E0000 ~ 4EFFFF | 1 | | |
| 4F0000 ~ 4FFFFF | 1 | | |
| 500000 ~ 50FFFF | 1 | | |
| 510000 ~ 51FFFF | 1 | | |

INFORMATION RECORDING MEDIUM, AND INFORMATION RECORDING APPARATUS AND METHOD

BACKGROUND OF THE INVENTION

1. Field of the Invention

The present invention relates to an information recording medium, such as an optical disc and a hard disk, and an information recording apparatus for and an information recording method of recording data onto such an information recording medium.

2. Description of the Related Art

There is known a technique in which management information for indicating a recording condition of the data in a recording area, i.e. whether or not the data is already recorded, is recorded onto a recording medium, such as the optical disc.

There is also known another technique in which it is detected whether or not the management information is updated even if the management information is not recorded onto the recording medium because of power shutdown or the like, for example, thereby preventing an inconsistency between the management information and the actual recording condition and improving reliability (e.g. Japanese Patent Application Laid Open NO. 07-44431).

However, according to the above-described technique, only the judgment of whether or not the management information about an entire recording area is updated to the newest information can be performed by detecting whether or not the management information is updated. Namely, it is impossible to judge or determine which management information in a physical or logical block (referred to as a "block" hereinafter if needed) indicated by a physical or logical address (referred to as an "address" hereinafter if needed) is not updated and thus is inconsistent with and does not correspond one-to-one with the actual recording condition. Thus, if the management information is not recorded onto the information recording medium, i.e. if the management information on the information recording medium is not updated to the newest information, because of the power shutdown or the like, it is necessary to verify or scan the entire recording area in some cases, for example, in order to update the management information, so that there is a possibility to take much time, which is a problem.

SUMMARY OF THE INVENTION

It is therefore an object of the present invention to provide an information recording medium, an information recording apparatus, and an information recording method, which are capable of greatly reducing a time length for updating the management information to the newest information even if it is judged that the management information recorded on the information recording medium is unreliable.

The above object of the present invention can be achieved by an information recording medium provided with: a recording area (e.g. a lead-in area, a data zone area, a lead-out area, or the like) divided into a plurality of partial areas (e.g. a divided user data area or the like); and an information area (e.g. the lead-in area, a management information recording area out of the lead-in area, or the like) for recording therein (i) management information (e.g. space bit map information, defect list information, or the like) for managing recording conditions of the plurality of partial areas at least for each of the plurality of partial areas and (ii) reliability information (e.g. reliability map information or the like) for indicating reliability of the management information for each of the plurality of partial areas.

According to the information recording medium of the present invention, the recording area is divided into the plurality of partial areas, and the data can be recorded for each of the plurality of partial areas. Here, the "data" associated with the present invention is data which becomes the main object of reproduction or execution, and it is, for example, contents data, such as image data, audio data, and text data, or data for a computer program, or the like.

The management information is recorded into the information area. Here, the "management information" associated with the present invention means information for managing the recording condition of each data at least for each of the plurality of partial areas (e.g., separately for each of the plurality of partial areas, or separately for each of small areas which are obtained by further dividing each of the partial areas into the small areas), in order to record the above-described data appropriately. For example, the management information includes information for indicating whether or not the data is already recorded in each of the plurality of partial areas, information for indicating whether or not there is a defect in each of the plurality of partial areas, or the like. Moreover, the management information may be updated or made at each opportunity or occasion of recording with respect to the information recording medium. Alternatively, it may be updated or made upon performing an operation, such as ejecting the information recording medium, after a series of recording is all completed, or the like. The management information may be information about the recording area, i.e. information about the entire recording area of the information recording medium including the information area, or may be information only about the information area, for example.

The reliability information for indicating the reliability of the management information for each of the plurality of partial areas, such as for area including a plurality of blocks, is recorded into the information area. If the entire recording area of the recording medium is divided into, e.g. 16 pieces of areas, the reliability information includes 16 pieces of flag information for indicating reliability of whether or not the management information corresponding to each of the plurality of partial areas obtained by dividing the entire recording area is updated to the newest information (referred to as a "first flag information" hereinafter if needed. A "second flag information" will be described later). The reliability information may be updated or made at each time that the management information is recorded onto the information recording medium. Alternatively, it may be updated or made upon performing an operation, such as ejecting the information recording medium, after the recording of the management information about the series of recording is all completed, or the like.

Since the present invention is constructed in the above manner, when the data is recorded onto the information recording medium or the present invention, for example, an empty partial area is specified on the basis of the management information read before the actual recoding operation, and the data can be recorded into the empty partial area. Alternatively, the position of a defect is specified, and the data can be recorded away from the position of the defect. Even if the management information is not recorded onto the information recording medium, i.e. if the management information on the information recording medium is not updated to the newest information, because of the power shutdown or the like, it is possible to specify a partial area in which the reliability is low according to the reliability information later. Therefore, what is needed is to update the management information to the newest information with respect to the specified partial area. Namely, it is unnecessary to verify or scan, i.e. read, the entire recording area, and it is enough to verify or scan only the specified partial area in which the reliability of the management information is low. Therefore, it is possible to greatly reduce a time length required for updating the management information of the entire recording area to the newest information.

For example, the information recording medium of the present invention is provided with only the division number, e.g. 16 pieces, of the reliability information for each of the plurality of partial areas obtained by dividing the entire recording area. More specifically, it is provided with the reliability information only by a data amount of 16 bits (2 bytes). As described above, the information recording medium of the present invention needs the reliability information with a data amount which is "the division number" times as large as that in the related art. However, it is possible to reduce the time length required for updating the management information of the entire recording area to the newest information to a time length which is "1/(the division number)" times as large, e.g. "1/16" times as large. Incidentally, the data amount of the reliability information which is "the division number" times as large can be sufficiently recorded into one sector which will be described later.

In one aspect of the information recording medium of the present invention, the information area is placed in a lead-in area of the recording area.

According to this aspect, the management information recorded in the information area can be obtained, for example, upon placing the information recording medium on the information recording apparatus, i.e. upon loading or mounting the information recording medium on the information recording apparatus.

In another aspect of the information recording medium of the present invention, the management information is provided with information for indicating whether or not data is recorded for each of small areas, which are obtained by further dividing each of the plurality of partial areas into a plurality of the small areas.

According to this aspect, the management information includes information obtained by combining the flag information for indicating a recording condition, such as "already recorded" or "unrecorded" (referred to as a "second flag information" hereinafter if needed.), in each of the small areas obtained by further dividing each partial area of the recording area of the information recording medium. More specifically, the small area is a logical or physical block specified by a logical or physical address of a sector of the recording area of the information recording medium. With respect to each of the small areas, i.e. each of the blocks, the second flag information by which the recording condition, such as "already recorded" or "unrecorded", can be distinguished is appended. The management information includes such information that a plurality of the second flag information for the small areas are combined. Therefore, upon recording the data, the partial area having relatively many unrecorded small areas is specified, and the data can be recorded into the specified partial area.

In particular, if a plurality of the second flag information are used as the management information, it is possible to recognize the distribution of the small areas of the unrecorded condition which are read upon placing the information recording medium on the information recording apparatus, and to update the second flag information corresponding to the already-recorded small areas, easily and quickly. It is also possible to reduce the data amount by using one type of the second flag information.

With respect to the space bit map information, which is one specific example of the management information, flag "1" is placed into the "already recorded" small area, i.e. the "already recorded" block, and flag "0" is placed into the "unrecorded" small area, i.e. the "unrecorded" block.

The management information may include not only the information for indicating whether or not to be already recorded, but also a defect list for indicating the position of a defect, for example.

In another aspect of the information recording medium of the present invention, the recording area is divided into the plurality of partial areas according to an attribute of data which is recorded therein.

According to this aspect, it is extremely effective if the recording area is divided into the plurality of partial areas according to the attribute of the data which is recorded into each of the plurality of partial areas. Here, the "attribute" associated with the present invention means characteristics corresponding to the purpose or the method of using the above-described data. For example, it is possible to divide the recording area into the partial areas functionally by the lead-in area, a spare area, the user data area, and the lead-out area, or the like, which will be described later. Even among the lead-in area, it is also possible to divide the lead-in area by the boundary of the management information recording area, an Optimized Power Control (OPC) area, or the like, which will also be described later. This is because a time length and a timing at which the data is used or recorded are similar in each of the partial areas. Thus, it is possible to minimize a range of the partial areas which are specified such that the reliability of the management information is low. More specifically, if the power is shutdown or the like when the reliability information is set to indicate low reliability with respect to each of the plurality of partial areas, the data is highly possibly recorded for a short time into the spatially close block or the like by spatial locality or time locality. Thus, it is possible to minimize the range of the partial areas which are specified such that the reliability of the management information is low. In addition to the attribute of data, the recording area may be divided equally on the basis of the data amount which can be recorded in the partial area.

In another aspect of the information recording medium of the present invention, the management information and the reliability information are described in a table format for each of the plurality of partial areas.

According to this aspect, if the management information corresponding to the partial area is inconsistent with the actual recording condition in the partial area and is not updated to the newest information, it is possible to quickly and easily specify the partial area in which the management information is not updated to the newest information, by the reliability information corresponding to the partial area, such as the first flag information in a table, for example.

The above object of the present invention can be also achieved by an information recording apparatus for recording data onto the above-described information recording medium (including its various aspects), the information recording apparatus provided with: a reading device for reading the management information from the information area; a determining device for determining at least one of the plurality of partial areas, which is managed by the management information read by the reading device, as a data-recording-area for recording the data; a first updating device for temporarily updating the reliability information, which corresponds to the management information for managing the determined data-recording-area, to information for indicating to be unreliable; a recording device for recording the data into the determined data-recording-area; and a second updating device for updating the management information after recording of the data is completed and for definitely updating the reliability information, which corresponds to the updated management information, to information for indicating to be reliable.

According to the information recording apparatus, in the operation thereof, the management information is read by the reading device, such as a processor, a decoder, and an optical pickup, from the information area of the information recording medium before the actual recording operation. In this case, the reliability information may be read as well as the management information. The read management information or both the read management information and the read reliability information may be preferably stored by the processor, a memory, or the like. Then, at least one (e.g. an unrecorded block, an unrecorded block without any defect, or the like) of the plurality of partial areas, which is managed by the read management information, is determined by the determining device, such as the processor, as the area for recording the data. Then, the reliability information corresponding to the area for recording the data is temporarily updated by the first updating device, such as the processor, an encoder, and the optical pickup, to the information for indicating to be unreliable. Then, the data is actually recorded by the recording device, such as the processor, the encoder, and the optical pickup, with respect to the area for recording the data among the recording area. Then, the management information is updated (i.e., updated to be the newest or updated management information) by the second updating device, such as the processor, the encoder, and the optical pickup, after the recording of the data by the recording device onto the area for recording the data is completed. At the same time or immediately before or after the updating of the management information, the reliability information corresponding to the updated management information, i.e. the reliability information which is temporarily updated to the information for indicating to be unreliable and which is associated with one partial area, is definitely updated to the information for indicating to be reliable.

Incidentally, at each time that the recording device records the data onto the information recording medium, the second updating device may update the management information at an appropriate timing, i.e. at each time of recording or at a time after a series of recording is completed.

Therefore, according to the information recording apparatus, even if the management information on the information recording medium is not updated to be the newest or updated management information upon processing because of the power shutdown or the like, it is possible to specify the partial area in which the reliability is low according to the reliability information later, so that it is possible to greatly reduce a time length required for updating the management information of the entire recording area to the newest information.

The information recording method of the present invention is an information recording apparatus for recording data onto the above-described information recording medium (including its various aspects), the information recording method provided with: a reading process of reading the management information from the information area; a determining process of determining at least one of the plurality of partial areas, which is managed by the management information read by the reading process, as a data-recording-area for recording the data; a first updating process of temporarily updating the reliability information, which corresponds to the management information for managing the determined data-recording-area, to information for indicating to be unreliable; a recording process of recording the data into the determined data-recording-area; and a second updating process of updating the management information after the recording of the data is completed and for definitely updating the reliability information, which corresponds to the updated management information, to information for indicating to be reliable.

According to the information recording method, even if the management information on the information recording medium is not updated to the newest information upon processing because of the power shutdown or the like, it is possible to specify the partial area in which the reliability is low according to the reliability information later, so that it is possible to greatly reduce a time length required for updating the management information of the entire recording area to the newest information.

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 4 is a structural diagram of a data table for indicating one specific example of addresses, space bit map information 120, and reliability flag, on the optical disc, which is one embodiment of the information recording medium of the present invention;

FIG. 6 is a structural diagram of a data table for indicating one specific example of addresses, space bit map information, and reliability flag, on the optical disc which is the comparison example;

DETAILED DESCRIPTION OF THE PREFERRED EMBODIMENTS

The embodiment of the information recording medium of the present invention will be explained with reference to FIG. 1 to FIG. 4 hereinafter.

Figure 1:
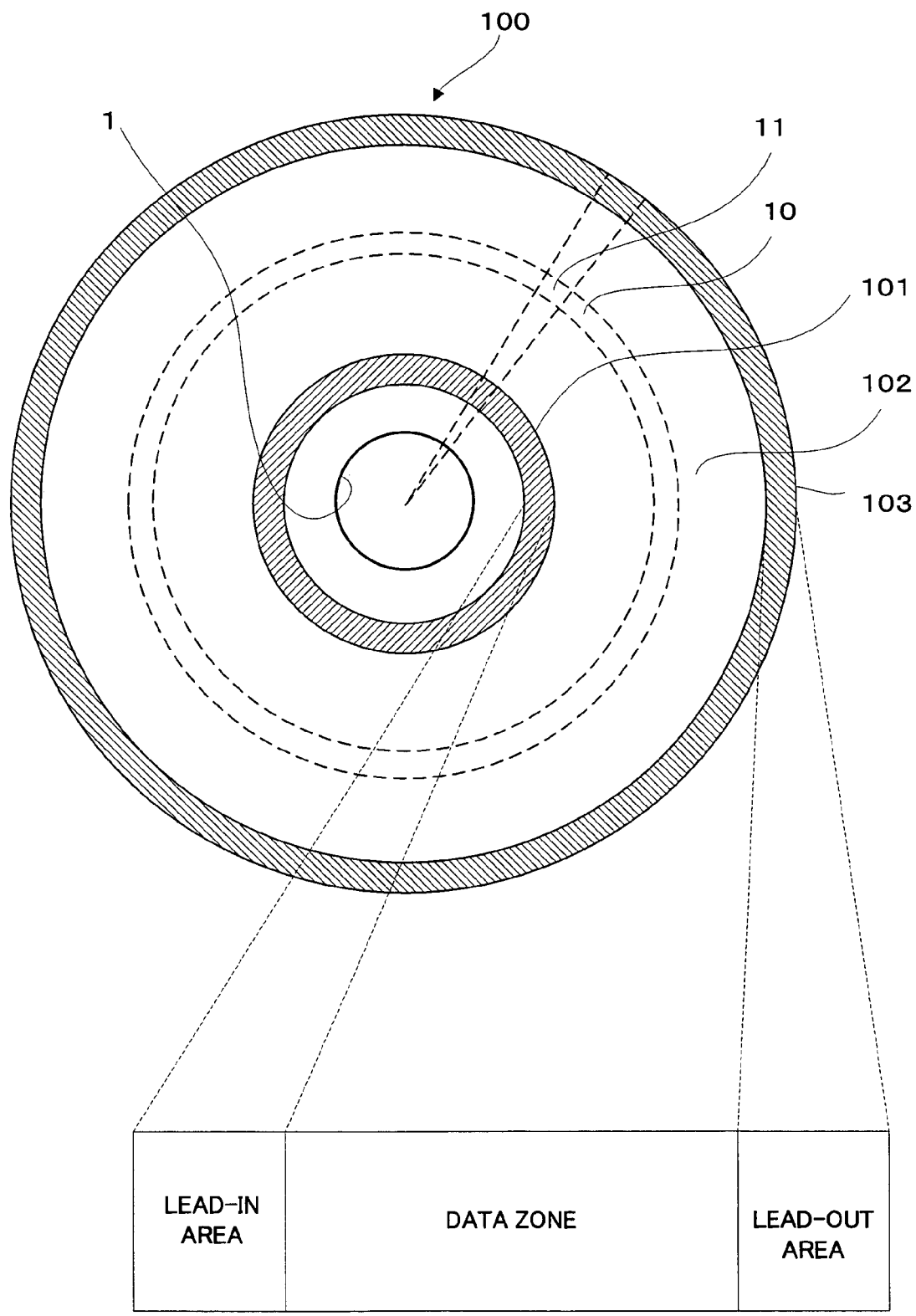
FIG. 1 shows the basic structure of an optical disc, which is one embodiment of an information recording medium of the present invention, wherein the upper part is a substantial plan view of the optical disc having a plurality of recording areas, and the lower part, which corresponds to the upper part, is a schematic diagram of a recording area structure in the radial direction.

Firstly, the basic structure of an optical disc in the embodiment will be explained with reference to FIG. 1. Incidentally, one example of the optical disc in the embodiment is a rewritable optical disc. The optical disc may be a write-once-type optical disc. FIG. 1 shows the basic structure of an optical disc, which is one embodiment of an information recording medium of the present invention, wherein the upper part is a substantial plan view of the optical disc having a plurality of areas, and the lower part, which corresponds to the upper part, is a schematic diagram of a recording area structure in the radial direction. The "recording area" associated with the present invention includes the "information area" associated with the present invention.

As shown in FIG. 1, an optical disc 100 is rewritable, for example. It is provided with the "recording area divided into a plurality of partial areas" associated with the present invention from the inner to the outer circumferential side, with a center hole 1 as the center, on a recording surface on the disc main body with a diameter of about 12 cm, as is a Digital Versatile Disc (DVD). The recording area is provided with: a lead-in area 101; a data zone 102; and a lead-out area 103. The lead-in area 101 includes the "information area" associated with the present invention. Tracks 10, such as groove tracks and land tracks, are alternately placed in each recording area, spirally or concentrically with the center hole 1 as the center, for example. The groove tracks may be wobbled. Alternatively, pre-pits may be formed on either one of or both groove and land tracks. The data is divided by a unit of sector 11 and recorded onto the tracks 10. Incidentally, the present invention is not specially limited to the optical disc 100 having such three recording areas.

Figure 2:
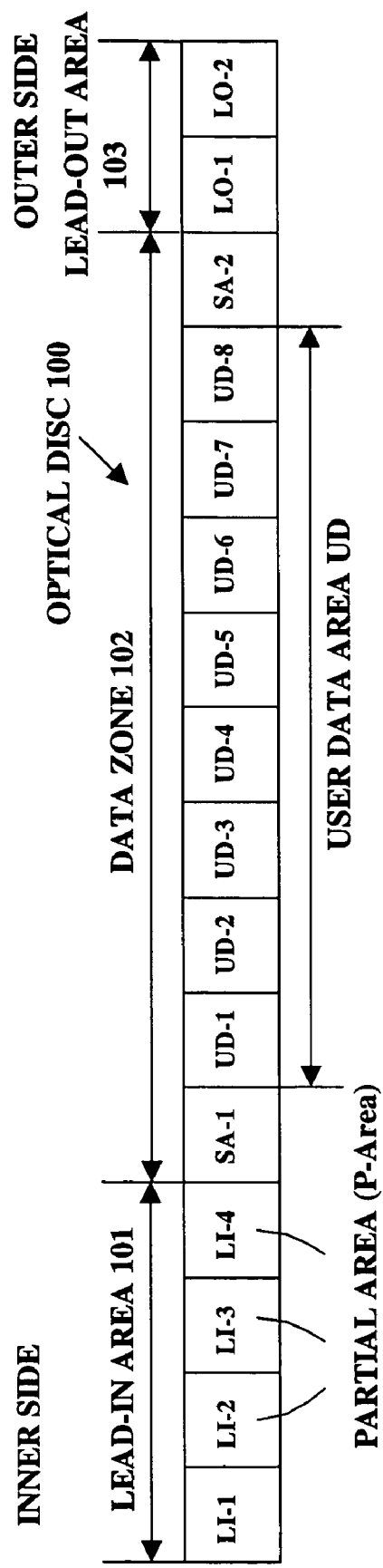
FIG. 2 is a structural diagram showing the recording area of the optical disc, which is one embodiment of the information recording medium of the present invention.

Next, the structure of the recording area of the optical disc in the embodiment of the present invention and the information and data recorded on the optical disc will be explained with reference to FIG. 2. FIG. 2 shows the recording area of the optical disc, which is one embodiment of the information recording medium of the present invention. Incidentally, the left side in FIG. 2 is the inner circumferential side of the optical disc 100, and the right side in FIG. 2 is the outer circumferential side of the optical disc 100. In FIG. 2, the recording area of the optical disc 100 is divided, e.g. by 16 pieces. One example of the "partial area" associated with the present invention is the recording area divided by 16 pieces, i.e. a P-area, such as "LI-2", "LI-3," or "LI-4", for example.

As shown in FIG. 2, in the recording area of the optical disc 100, there are the lead-in area 101 on the inner circumferential side thereof, the data zone 102 on the outer circumferential side of the lead-in area 101, and the lead-out area 103 on the outer circumferential side of the data zone 102.

Various information for controlling or managing the recording and reproducing of the data is recorded into the lead-in area 101 and the lead-out area 103. The control information is information for controlling the recording into and reading from the data zone 102, and it is, for example, information for indicating the attribute and the type of the information recording medium, information for management the address of the data, information for controlling a recording operation and a reading operation of the information recording/reproducing apparatus, such as a disc drive, or the like.

The inner and outer circumferential sides of the lead-in area 101 are provided with control information recording areas LI-1 and LI-4, respectively. Incidentally, the control information recording areas LI-1 and LI-4 are areas for recording therein the control information for controlling the recording into and reading from the data zone 102.

The central portion of the lead-in area 101 is provided with a management information recording area LI-2; and an Optimized Power Control (OPC) area LI-3, which are one example of the "information area" associated with the present invention. Here, the OPC is a function for outputting a laser with optimum power upon writing the record data onto the information recording medium. For example, the space bit map information, the reliability map information, or the like is recorded into the management information recording area LI-2, as described later (refer to FIG. 3). The lead out area 103 is provided therein with: control information recording areas LO-1 and LO-2.

The above-described data or user data is recorded into the data zone 102. The data zone 102 is provided therein with a plurality of user data areas UD-1 to UD-8, and the inner and outer circumferential sides thereof is provided with spare areas SA-1 and SA-2, respectively. The user data areas UD-1 to UD-8 are main areas for recording the data. The spare areas SA-1 and SA-2 are alternative recording areas for evacuating the data from a defect in the user data areas UD-1 to UD-8. Here, the defect is an area or a part in which the data cannot be recorded enough to accurately reproduce it because of a scratch or dusts on the recording medium, or the deterioration of the recording medium, or the like. Namely, if there is a defect in the user data areas UD-1 to UD-8, the data to be recorded at the position of the defect or the data which is already recorded at the position is alternatively recorded into the spare areas SA-1 and SA-2, and used for the subsequent reproduction.

The control information and the management information, and the data, which are recorded onto the information recording medium, as explained above, cannot be always distinguished clearly according to their contents. However, there is the following difference. The control information and the management information are mainly used directly for the operation control of the information recording/reproducing apparatus, such as the disc drive. On the other hand, the data mainly becomes only the object of recording or reading on the information recording/reproducing apparatus and is mainly used for the data reproducing or the program executing performed by a backend or a host computer, for example. According to such a difference in their characteristics or the like, the data is recorded into the data zone 102, while the control information and the management information are recorded into the control information recording areas LI-1 and LI-4, the management information recording area LI-2, the OPC area LI-3, which are in the lead-in area 101, and the control information recording areas LO-1 and LO-2, which are in the lead-out area 103.

Figure 3:
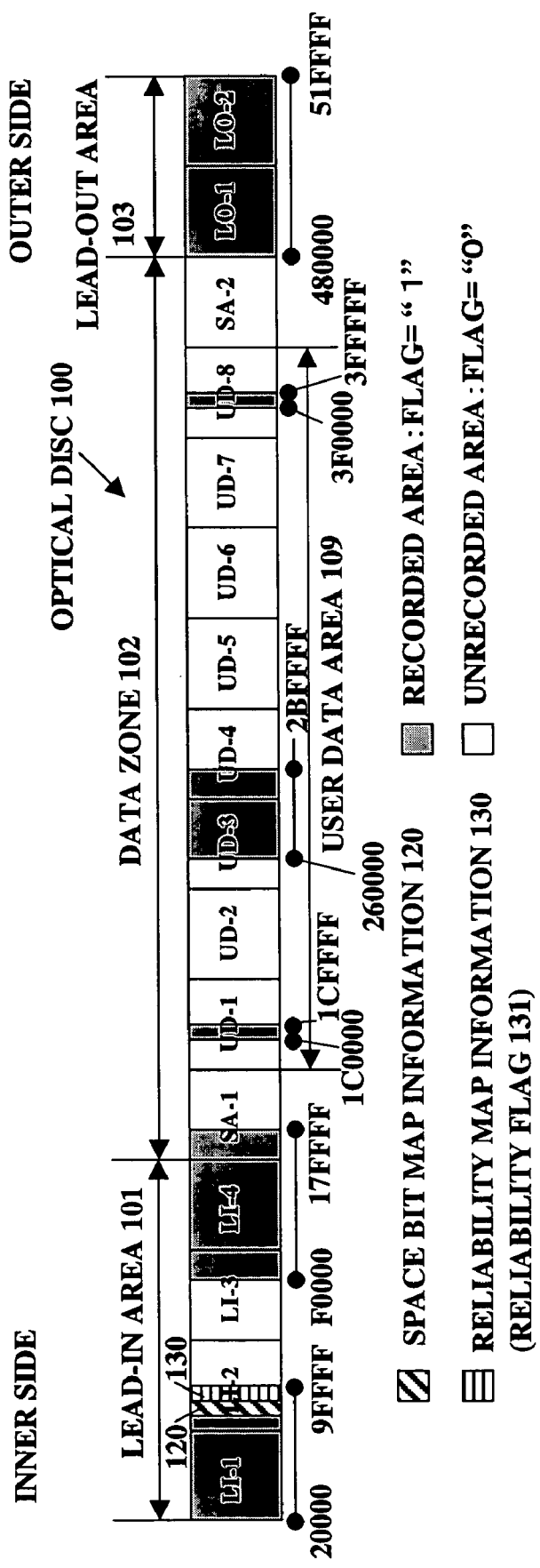
FIG. 3 is a divided structural diagram of the recording area to which the recorded information is appended on the optical disc, which is one embodiment of the information recording medium of the present invention.

Next, with respect to FIG. 3, the structure of the recording area of the optical disc in the embodiment, the recording area in which the information is already recorded on the optical disc, and the address will be explained in one specific example. FIG. 3 shows the recording area to which the recorded information is appended on the optical disc, which is one embodiment of the information recording medium of the present invention.

Space bit map information 120 constructing one example of the "management information" associated with the present invention is recorded into the management information recording area LI-2 shown in FIG. 3.

The space bit map information 120 is such information that a plurality of the second flag information for indicating a recording condition for each block, such as "already recorded" or "unrecorded", are combined with respect to the entire optical disc 100. Specifically, the space bit map information 120 is information obtained by combining the second flag information by which the recording condition, such as "already recorded" or "unrecorded", can be distinguished for each block specified by the address of a sector of the recording area on the information recording medium, with respect to the entire optical disc 100 (i.e. all the blocks). In particular, the space bit map information 120 is updated or made at each time of recording with respect to the information recording medium, in a memory built in the information recording apparatus, after it is firstly read before the actual recording operation by the information recording apparatus for recording the data onto the optical disc 100. After that, the newest space bit map information 120 as updated or made in this manner is written into the management information recording area LI-2 at an appropriate timing, for example, at each time of finishing to record, or at a time upon performing an operation, such as EJECT, or the like. Thus, as long as the recording is normally ended, the effective space bit map information 120 is written on the optical disc 100. Incidentally, in the embodiment, the second flag information "1" is placed into the space bit map information 120 with respect to the "already recorded" recording area, and the second flag information "0" is placed into the space bit map information 120 with respect to the "unrecorded" recording area.

As shown in FIG. 3, the address is expressed with the hexadecimal number in one example of the embodiment. The blocks indicated by the addresses "20000 to 9FFFF", "F0000 to 17FFFF", "1C0000 to 1CFFFF", "260000 to 2BFFFF", "3F0000 to 3FFFFF", and "480000 to 51FFFF" (i.e. areas painted gray in FIG. 3) are the "already recorded" recording areas. On the other hand, the blocks not-indicated by the above addresses are the "unrecorded" recording areas. More specifically, in a DVD-RW having a recording capacity of 4.7 GB, one sector is 2048 bytes, and one block is 16 sectors (about 32.8 KB). Thus, the data amount of the space bit map information 120 recorded by a unit of the block is 4.7 GB/(2048×16) bytes/8=about 17.9 KB, which is small enough to be included in one block. Incidentally, the space bit map information 120 may be not only the information about the entire recording area of the optical disc 100, but also information only about the user data areas UD or the lead-in area 101, for example.

Reliability map information 130 constructing one example of the "reliability information" associated with the present invention is recorded into the management information recording area LI-2. The reliability map information 130 is such information that a plurality of the first flag information for indicating reliability of whether or not the space bit map information 120 corresponding to each of the P-areas is updated to the newest information, are combined with respect to the entire optical disc 100 (i.e. all the P-areas). Here, the space bit map information 120 corresponds to each partial area, i.e. each P-area, which is obtained by dividing the entire recording area of the recording medium by e.g. 16 pieces. Specifically, if the space bit map information 120 corresponding to each of the P-areas is inconsistent with the actual recording condition of each of the P-areas and is not updated to the newest information, the first flag information "1" is placed into reliability flag 131. On the other hand, if it matches with the actual recording condition of the P-area and is updated to the newest information, the first flag information "0" is placed. The reliability map information 130 is such information that a plurality of the reliability flag 131 are combined with respect to the entire optical disc 100. More specifically, in the embodiment, the reliability map information 130 is obtained by combining the first flag information corresponding to each of the 16 pieces of P-areas, so that it has a data amount of 16 bits (2 bytes). If the newest space bit map information 120 is written into the management information recording area LI-2, the reliability map information 130 for indicating that the space bit map information 120 is effective is also written into the management information recording area LI-2. Particularly in the embodiment, such reliability flag is placed into the reliability map information 130 by a unit of the P-area provided with a plurality of blocks, as explained later.

Next, with reference to FIG. 4, the head and tail addresses of a sector in a unit of the block of the entire recording area, the space bit map information 120, a name of the partial area obtained by dividing the entire recording area, i.e. a P-area's name, and the reliability flag 131 corresponding to each of the P-areas will be explained in one example. FIG. 4 shows a data table for indicating one specific example of the addresses, the space bit map information 120, and the reliability flag 131, on the optical disc 100, which is one embodiment of the information recording medium of the present invention.

As shown in FIG. 4, with respect to all the blocks specified by the previous recording with the address of the recording area of the information recording medium, such as the rewritable optical disc, the second flag information "1" is placed into the field of the space bit map information 120 for the "already recorded" block, and the second flag information "0" is placed for the "unrecorded" block. In the field of the P-area name, the name of each partial area obtained by dividing the entire recording area by 16 pieces, i.e. each P-area name, is described. Then, upon the current recording, such a data table is firstly taken into the information recording/reproducing apparatus. Although the data is normally recorded by the current recording with respect to, e.g. the block indicated by the addresses of the recording area "100000" to "10FFFF", if the power is shut down on the main body of the information recording/reproducing apparatus at a timing at which the management information and the reliability information recorded in the management information recording area LI-2 on the optical disc 100 are not updated to the newest information, the space bit map information 120 corresponding to the block is not updated to the newest information on the optical disc 100. Namely, although the recording of the data on the optical disc 100 is actually ended, the space bit map information 120 corresponding to the block in which the data is recorded on the optical disc 100 still has the second flag information "0" for indicating to be "unrecorded" and is not updated to the newest information (refer to a "X" mark in a field of recorded flag 121 for indicating to be "recorded" shown by the addresses "100000" to "10FFFF" in FIG. 4). In this case, on the optical disc 100, the first flag information "1" remains only in the field of the reliability flag 131 corresponding to the P-area LI-3 by temporal updating which is performed before the data recording. Thus, it is possible to recognize the fact that the space bit map information 120 is not updated to the newest information. On the other hand, if the data is normally recorded with respect to, e.g. the blocks indicated by the addresses "20000" to "6FFFF" and the space bit map information 120 is normally updated, the second flag information "1" for indicating to be "already recorded" is placed into the field of the space bit map information 120 and the space bit map information 120 is updated to the newest information. In this case, the first flag information "0" is placed into the field of the reliability flag 131 corresponding to the P-area "LI-1" including the blocks. Namely, resetting the first flag information to "0" is performed.

As described above, one of the differences of the structure of the embodiment from that of a comparison example described later is that even if the space bit map information 120 is not recorded onto the information recording medium because of the power shutdown or the like, for example, it is possible to specify the P-area later in which the reliability is low according to the reliability flag 131 for indicating the reliability of the space bit map information 120, so that it is possible to greatly reduce a time length required for updating the space bit map information 120 of the entire recording area to the newest information.

Specifically, as described above, although the data is normally recorded with respect to a certain P-area, if the power is shutdown on the main body of the information recording/reproducing apparatus, the space bit map information 120 corresponding to the certain P-area is not updated to the newest information in some cases. In this case, the first flag information "1" is placed into the field of the reliability flag 131 and the P-area "LI-3" in which the reliability is low can be specified, so that what is needed is to update the space bit map information 120 to the newest information with respect to the specified P-area. Namely, it is unnecessary to verify or scan the entire recording area, and it is enough to verify or scan only the P-area "LI-3" which is specified such that the reliability of the space bit map information 120 is low. Therefore, it is possible to greatly reduce a time length required for updating the space bit map information 120 of the entire recording area to the newest information.

More specifically, the recording area in the embodiment is divided into the P-areas, and is provided with only the division number of the reliability flag 131 corresponding to each of the P-areas, e.g. only by a data amount of 16 bits (2 bytes). On the other hand, the recording area in the comparison example described later is provided with only one reliability flag 132, i.e. only by a data amount of 1 bit, as the information for indicating the reliability of whether or not the space bit map information 120 of the entire recording area indicates the newest information. As described above, the embodiment needs the management information reliability flag with a data amount which is "the division number" times as large, with respect to the comparison example described later. However, it is possible to reduce the time length for updating the space bit map information 120 corresponding to each of the P-areas to the newest information to a time length which is "1/(the division number)" times as large, e.g. "1/16" times as large. Incidentally, it is possible to record the data amount which is "the division number" times as large into the above-described one sector sufficiently.

Particularly in the embodiment, upon dividing the entire recording area into the P-areas, it is extremely useful to divide it by a boundary corresponding to how to use the P-area. For example, it may be divided by the lead-in area 101, the spare area SA-1 or SA-2, the user data areas UD, and the lead-out area 103. This is because a time length and a timing at which the data is used or recorded are similar in each of the P-areas. Thus, if the power is shutdown or the like when the reliability flag 131 is set with respect to each of the P-areas, the data is highly possibly recorded for a short time into the spatially close block or the like by spatial locality or time locality. Therefore, it is possible to minimize a range of the P-areas which are specified such that the reliability of the space bit map information 120 is low. It is also possible to further reduce a time length for scanning and a time length for updating the space bit map information 120 corresponding to each of the P-areas to the newest information, and to improve the efficiency.

Figure 5:
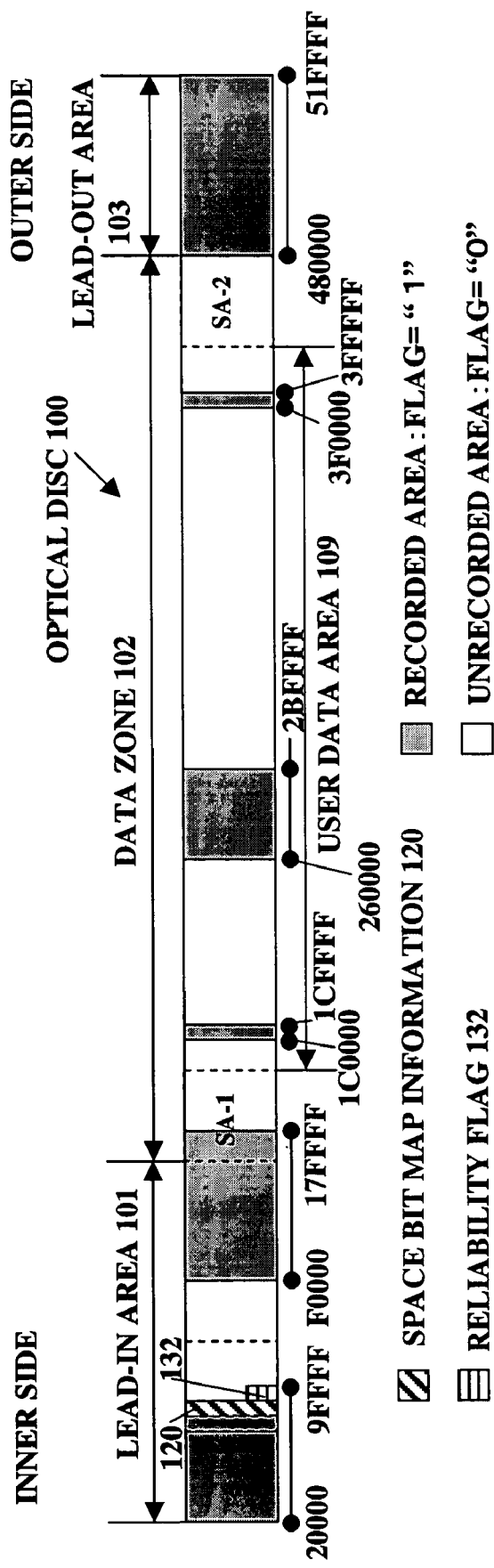
FIG. 5 is a structural diagram showing a recording area to which the recorded information is appended on an optical disc which is a comparison example.

Next, with reference to FIG. 5 and FIG. 6, the operation efficiency of the embodiment will be examined. FIG. 5 shows a recording area to which the recorded information is appended on an optical disc which is the comparison example. FIG. 6 shows its data table. Incidentally, the same explanation described with reference to FIG. 2 and FIG. 3 applies to the structure of the recording area of the optical disc.

The space bit map information 120 constructing one example of the "management information" associated with the present invention, as described above, is recorded into the management information recording area LI-2 shown in FIG. 5.

The reliability flag 132 constructing one example of the reliability information for indicating the reliability of the management information associated with the comparison example is recorded into the management information recording area LI-2.

In the comparison example, the recording area is not divided as a unit for providing the reliability flag as in the embodiment. There is only one reliability flag 132 as the information for indicating whether or not the space bit map information 120 of the entire recording area is normally updated. Specifically, if the optical disc 100 is inserted into the information recording/reproducing apparatus described later, the first flag information "1" is placed into the reliability flag 132. If the space bit map information 120 is normally updated to the newest information, resetting to the first flag information "0" is performed when the optical disc 100 ejects. On the other hand, although the data is normally recorded onto the optical disc 100, if the power is shutdown on the main body of the information recording/reproducing apparatus described later and the space bit map information 120 is not updated to the newest information corresponding to the block, the first flag information "1" remains in the field of the reliability flag 132. As described above, even if it is judged by the reliability flag 132 that the space bit map information 120 corresponding to any one of the blocks is unreliable, it is necessary to verify or scan the entire recording area in order to normally update the space bit map information 120, for example.

As opposed to this, according to the optical disc 100 in the embodiment described with reference to FIG. 1 to FIG. 5, even if the space bit map information 120 is not updated to the newest information, it is possible to remarkably reduce an area which is verified or scanned in order to normally update the space bit map information 120, so that it is extremely useful as compared with the comparison example.

(Information Recording/Reproducing Apparatus)

Next, with reference to FIG. 7 to FIG. 13, the structure and the operation of an information recording/reproducing apparatus 300 (referred to as a "disk drive 300" hereinafter as the occasion demands) associated with the embodiment of the present invention will be explained. Particularly, in the embodiment, the information recording apparatus of the present invention is applied to the information recording/reproducing apparatus for the optical disc described above.

Figure 7:
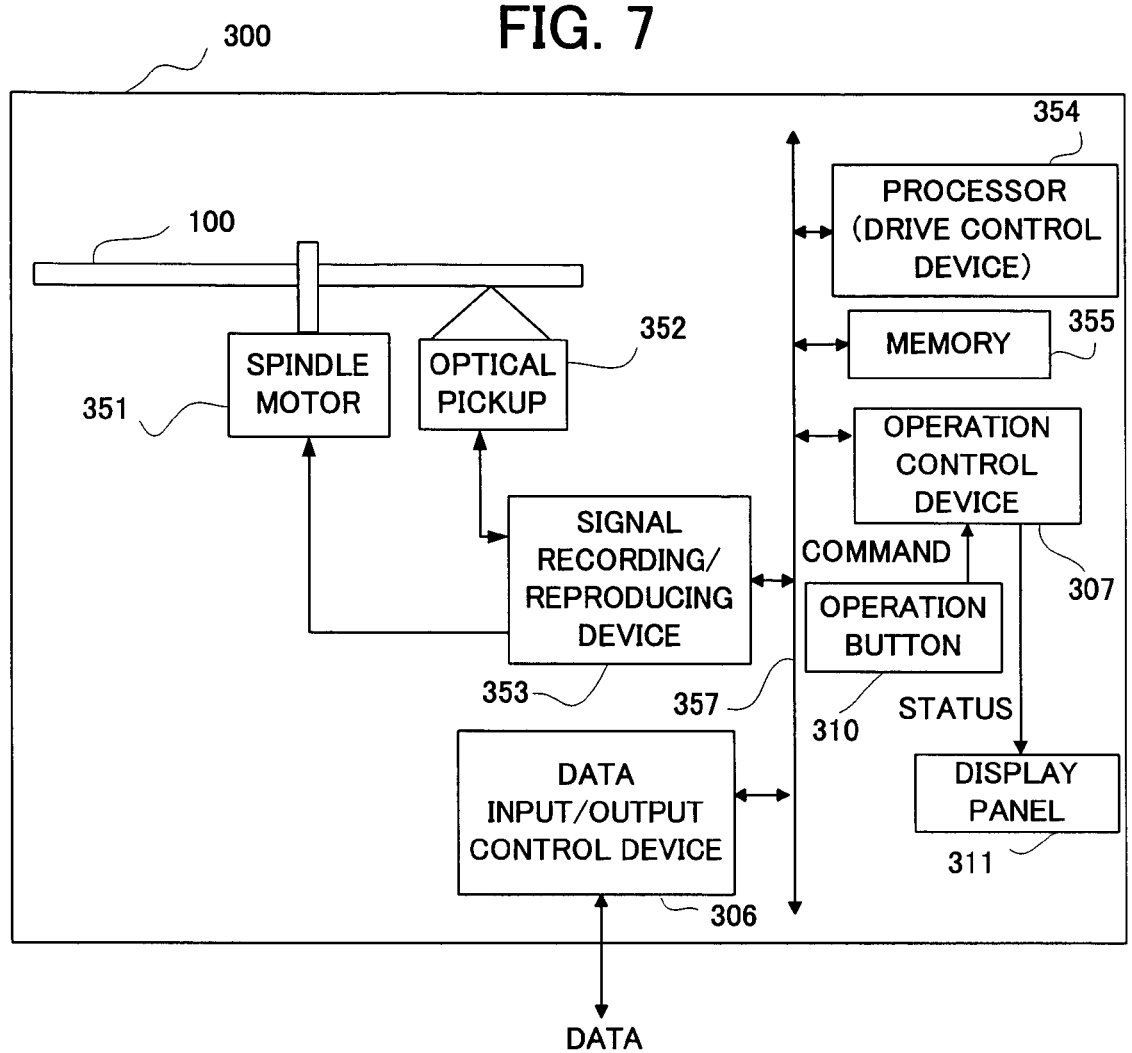
FIG. 7 is a block diagram showing an information recording/reproducing apparatus associated with an embodiment of the present invention.

Firstly, with reference to FIG. 7, the structure of the information recording/reproducing apparatus 300 will be explained. FIG. 7 shows the information recording/reproducing apparatus 300 associated with the embodiment of the present invention. Incidentally, the information recording/reproducing apparatus 300 is provided with: a function of recording the record data onto the optical disc 100; and a function of reproducing the record data recorded on the optical disc 100.

The inner structure of the information recording/reproducing apparatus 300 will be explained with reference to FIG. 7. The information recording/reproducing apparatus 300 is an apparatus for recording the information onto the optical disc 100 and reading the information recorded on the optical disc 100, under the control of a processor 354.

The information recording/reproducing apparatus 300 is provided with: the optical disc 100; a spindle motor 351; an optical pickup 352; a signal recording/reproducing device 353; the processor (drive control device) 354; a memory 355; a data input/output control deice 306; a power control device 308; an operation button 310; a display panel 311; and a bus 357.

The spindle motor 351 rotates and stops the optical disc 100, and operates upon accessing the optical disc 100. More specifically, the spindle motor 351 is constructed to rotate and stop the optical disc 100 at a predetermined speed while receiving spindle-servo from a not-illustrated servo unit or the like.

The optical pickup 352 performs the recording/reproducing with respect to the optical disc 100, and is provided with a laser apparatus and a lens. More specifically, upon reproducing, the optical pickup 352 irradiates a light beam, such as a laser beam, onto the optical disc 100 as reading light with first power. Upon recording, the optical pickup 352 irradiates a light beam, with it modulated, onto the optical disc 100 as writing light with second power.

The signal recording/reproducing device 353 performs the recording/reproducing with respect to the optical disc 100 by controlling the spindle motor 351 and the optical pickup 352.

The memory 355 includes a buffer area for the record/reproduction data, an area used as an intermediate buffer upon converting into the data which can be used on the signal recording/reproducing device 353, or the like, and it is used in all the data processing on the disc drive 300.

In particular, the memory 355 is provided with: a Read Only Memory (ROM) area into which a program for performing an operation as a recording device is stored; a Random Access Memory (RAM) area into which a parameter required for the program operating is stored; or the like. In the embodiment, even if the power is shutdown, it is possible to efficiently update the space bit map information 120 by virtue of the reliability flag 131 stored in the memory 355.

The processor (drive control device) 354 is connected to the signal recording/reproducing device 353 and the memory 355 via the bus 357, and controls the entire information recording/reproducing apparatus 300 by giving an instruction to each control device. In general, software for operating the processor 354 is stored in the memory 355.

The data input/output control device 306 controls the data input/output from the outside with respect to the information recording/reproducing apparatus 300, and stores the data into or extracts it from a data buffer on the memory 355. If the data input/output is a video or picture signal, the data received from the outside is compressed or encoded into a Moving Picture Experts Group (MPEG) format and outputted to the memory 355 upon inputting the data. Upon outputting the data, the data in the MPEG format received from the memory 355 is decompressed or decoded and outputted to the outside.

The operation control device 307 receives the operation instruction with respect to the information recording/reproducing apparatus 300 and performs display. It sends the instruction of recording or reproducing by the operation bottom 310 to the processor 354, and outputs the operational condition of the information recording/reproducing apparatus 300, such as during record and during reproduction, to the display panel 311, such as a fluorescent tube.

As described above, among household equipment, one example of the information recording/reproducing apparatus 300 is a recording device for recording/reproducing video or pictures. The recording device is a device for recording a video signal from a broadcast reception tuner or an external connection terminal onto a disc and for outputting the video signal reproduced from the disc to an external display device, such as TV. It performs an operation as a recording device by performing the program stored in the memory 355 on the processor 354.

Figure 8:
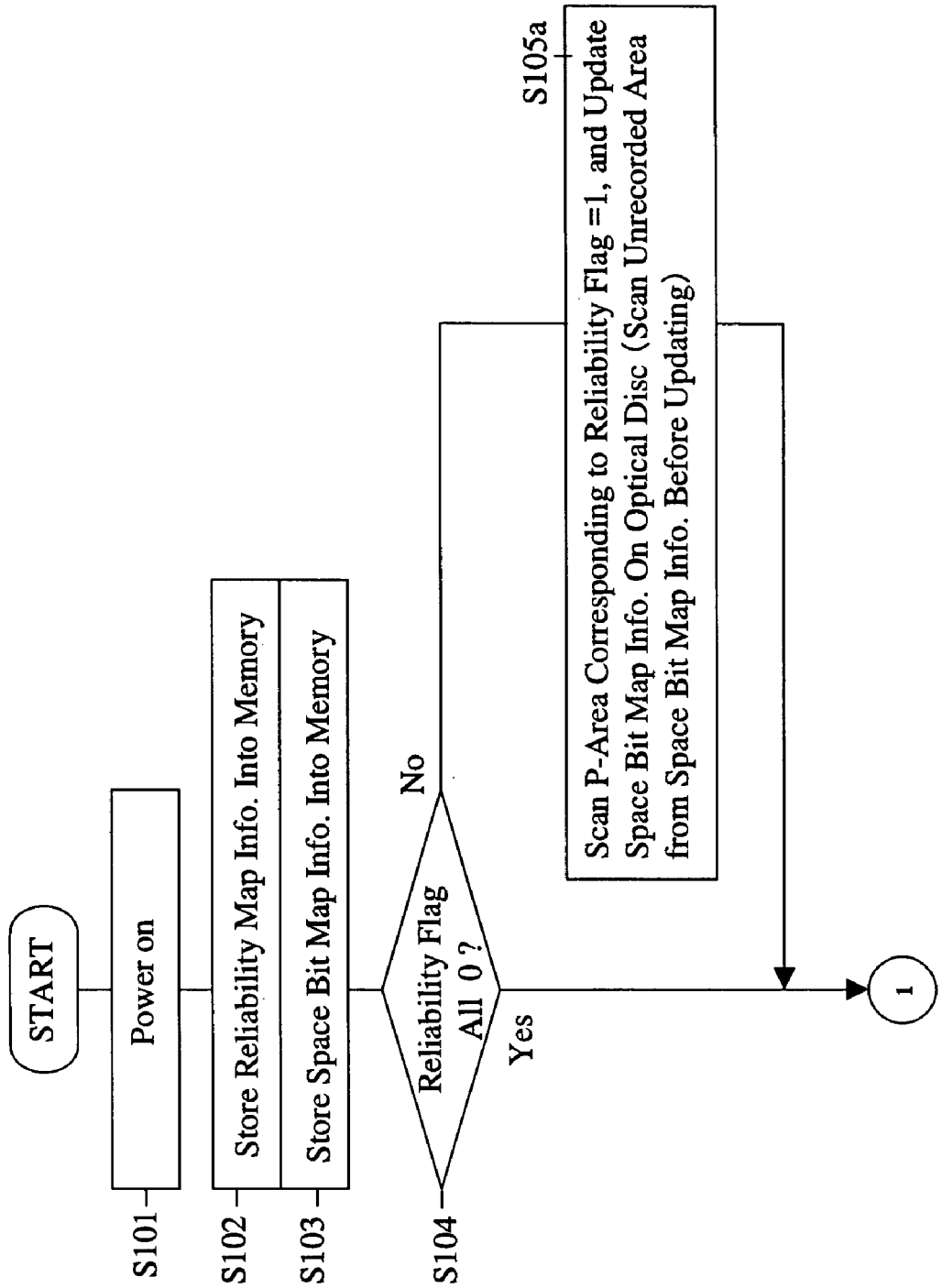
FIG. 8 is a flowchart showing such an operation that the space bit map information is updated on a rewritable optical disc on the basis of reliability map information on the information recording/reproducing apparatus in the embodiment of the present invention.
Figure 9:
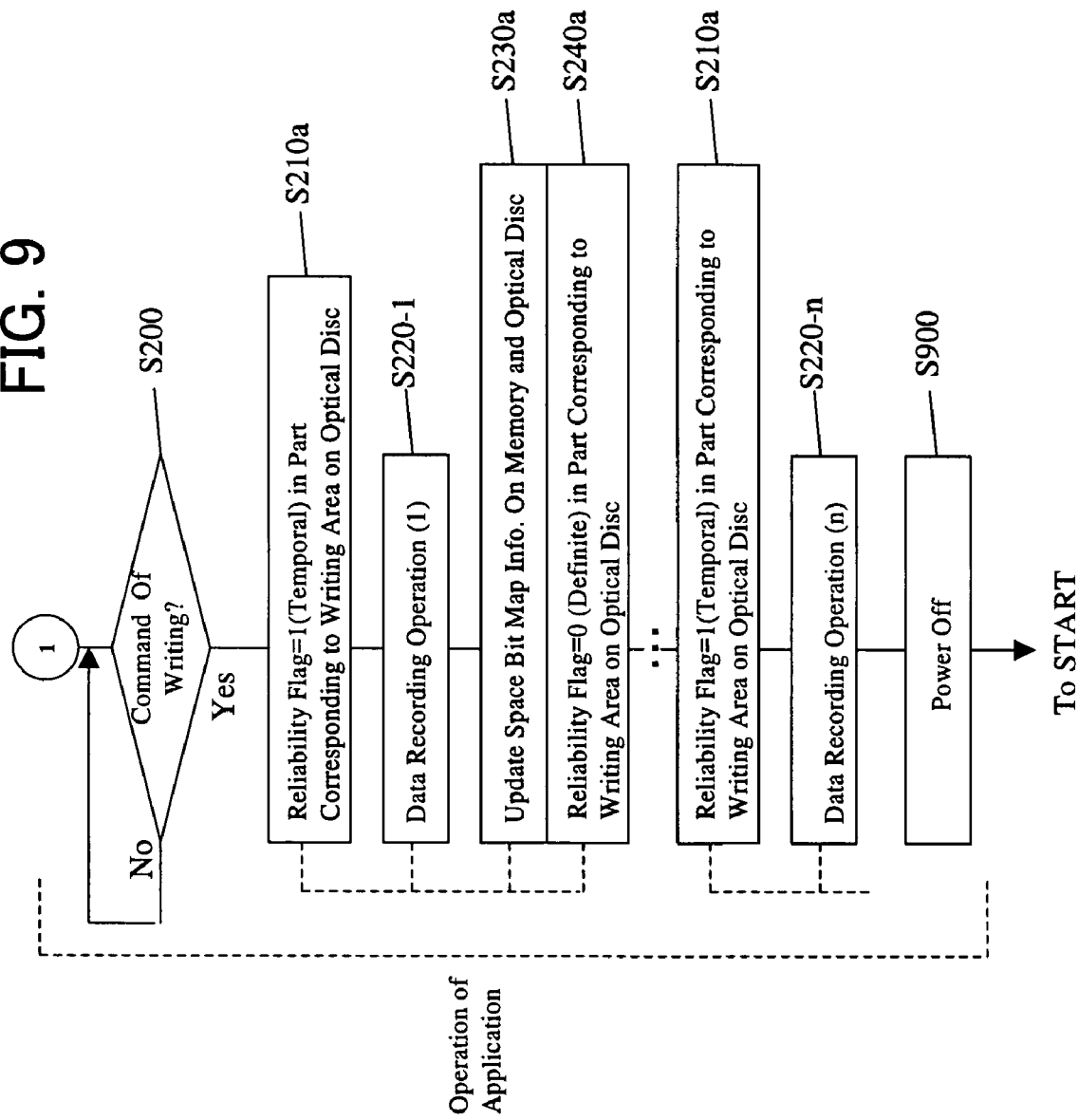
FIG. 9 is a flowchart showing a recording operation if power is shutdown in FIG. 8.
Figure 10:
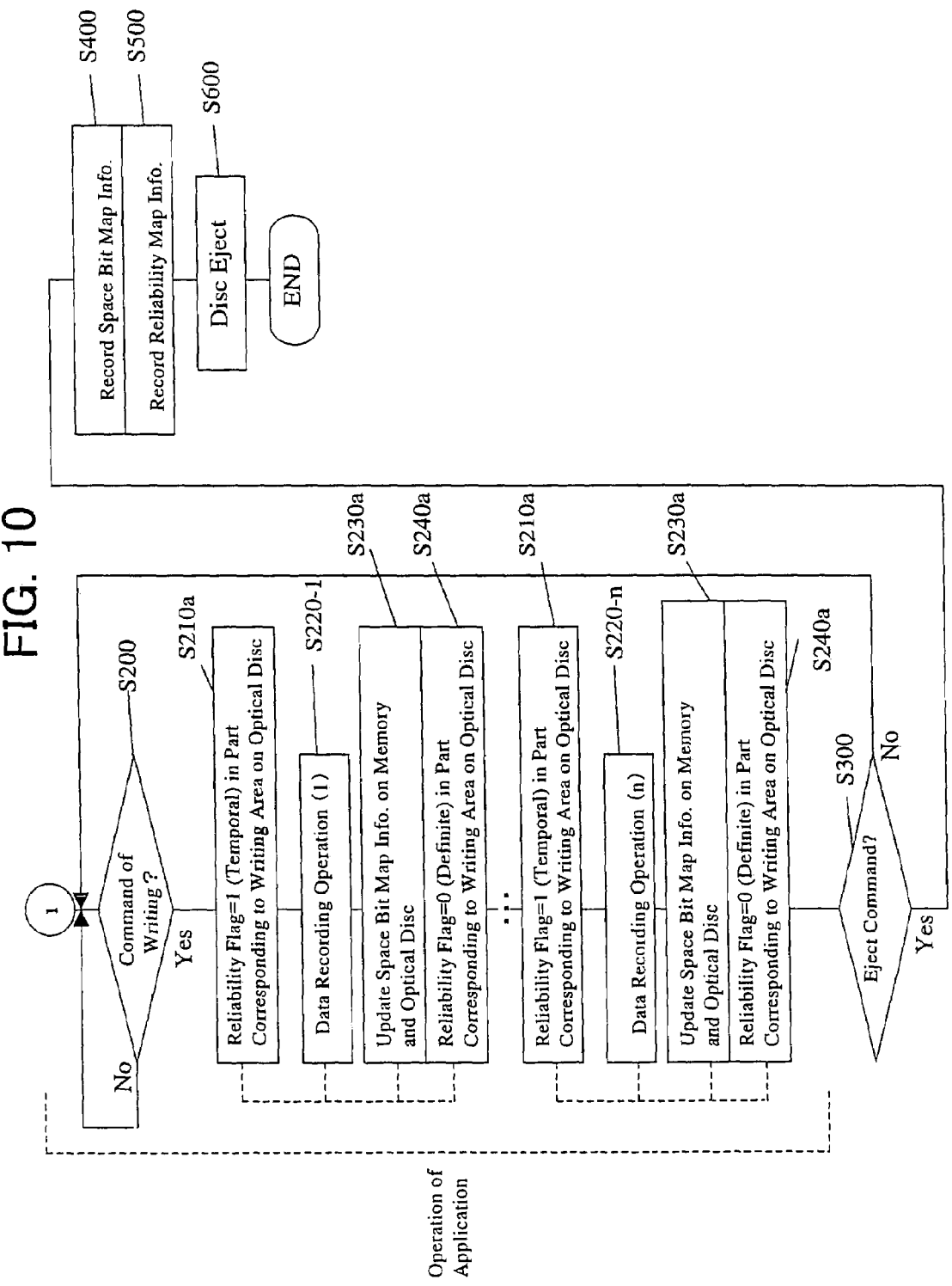
FIG. 10 is a flowchart showing a recording operation in the normal case in FIG. 8.

Next, with reference to FIG. 8 to FIG. 10, the recording operation and the updating operation that the space bit map information 120 is updated on the optical disc 100 on the basis of the reliability map information 130 by the information recording/reproducing apparatus 300 in the embodiment whose structure is explained in FIG. 7 will be explained. FIG. 8 shows such an operation that the space bit map information 120 is updated on the optical disc 100 on the basis of the reliability flag 131 constructing the reliability map information 130 on the information recording/reproducing apparatus 300 in the embodiment. FIG. 9 shows a recording operation if the power is shutdown on the information recording/reproducing apparatus 300 in the embodiment. FIG. 10 shows a recording operation in the normal case on the information recording/reproducing apparatus 300 in the embodiment.

The operation in each processing is basically instructed by that a command with respect to the information recording/reproducing apparatus 300 is issued from the operation button 310. The recording of the data onto the optical disc 100 and the reproducing of the data from the optical disc 100 are performed by the information recording/reproducing apparatus 300.

Firstly, with reference to FIG. 8, the operation that the space bit map information 120 is updated on the optical disc 100 on the basis of the reliability flag 131 constructing the reliability map information 130 on the information recording/reproducing apparatus 300 in the embodiment will be explained.

The information recording/reproducing apparatus 300 in the embodiment is powered on and started (step S101). Incidentally, it is assumed that the optical disc 100 is already placed or inserted therein.

Before setting the recording area for recording therein the data, the processor 354 confirms whether or not the disc is already placed or inserted in the information recording/reproducing apparatus 300. Then, it issues a command of reading the information recorded on the disc. The optical pickup 352 reads the newest reliability map information 130 from the management information recording area LI-2 on the optical disc 100. Under the control of the processor 354, the reliability map information 130 is stored in the RAM area of the memory 355 via the bus 357 (step S102).

The space bit map information 120 is stored into the RAM area of the memory 355 of the information recording/reproducing apparatus 300 (step S103), as with the reliability map information 130 in the step S102.

The information recording/reproducing apparatus 300 judges or determines whether or not the reliability flag 131 of the reliability map information 130 stored in the memory 355 is all "0" (step S104). If "1" is placed in the reliability flag 131 corresponding to a certain P-area (the step S104: No), the space bit map information 120 is updated to the newest information on the optical disc 100 because the reliability of the space bit map information 120 corresponding to the P-area is low. Specifically, with respect to some P-areas in which "1" is placed in the reliability flag 131, scanning, i.e., reading is performed, and the "already recorded" recording area and the "unrecorded" recording area are judged. Moreover, the space bit map information 120 recorded in the management information recording area LI-2 on the optical disc 100 is updated to the newest information (step S105a). Incidentally, upon scanning the recording area, it is efficient to preferentially scan the unrecorded area indicated in the space bit map information 120 before the updating. The reliability map information 130 as the reliability flag information updated at the same time is recorded into the management information recording area LI-2 on the optical disc 100.

On the other hand, if the reliability flag 131 of the reliability map information 130 is all "0" (the step S104: Yes) as a result of the judgment in the step S104, the updating on the optical disc 100 is not performed because the space bit map information 120 indicates the newest information.

Next, with reference to FIG. 9, a recording operation and an updating operation on the optical disc 100 if the power is shutdown during the operation of an application on the information recording/reproducing apparatus 300.

After obtaining the reliability map information 130 and the space bit map information 120 or the like explained in FIG. 8, or after updating in addition to the obtaining, the information recording/reproducing apparatus 300 waits for an instruction for starting to record, i.e. a command of writing (step S200).

If a record button is pushed on the operation button 310, the processor 354 detects the pushing. If the data from the data input/output control device 306 is stored into the memory 355, the processor 354 judges or determines that the instruction for starting to record, i.e. the command of writing, is issued (the step S200: Yes).

On the other hand, if the record button is not pushed on the operation button 310, the information recording/reproducing apparatus 300 keeps waiting for the instruction for starting to record, i.e. the command of writing, to be issued (the step S200: No).

Then, the processor 354 sets the recording area into which the data is recorded, i.e. written, on the basis of the space bit map information 120 stored in the memory 355, and determines the address and the record data length of the recording area. "1" is temporarily placed into the reliability flag 131 corresponding to the P-area belonging to the recording area determined in this manner, which is in the management information recording area LI-2 on the optical disc 100 (step S210a).

Then, under the control of the processor 354, a command of recording the data is issued on the basis of the address and the record data length of the recording area determined in the above manner, and the data is actually recorded into the recording area on the optical disc 100 (step S220-1). The processor 354 which has received a command completion status distinguishes the "already recorded" recording area, and updates the space bit map information 120 stored on the memory 355 and stored in the management information recording area LI-2 on the optical disc 100 (step S230a). After the updating of the space bit map information 120 is completed, "0" is definitely placed into the reliability flag 131 corresponding to the P-area of interest, which is in the management information recording area LI-2 on the optical disc 100 (step S240a).

After that, a series of recording operations from the step S210a to the step S240a is repeated. Incidentally, the actual recording into the recording area on the optical disc 100 for the "n"th time is referred to as a "step S220-n".

Then, in the "n"th recording operation, "1" is temporarily placed into the reliability flag 131 corresponding to the P-area (step S210a), and the recording into the recording area on the optical disc 100 for the "n"th time (step S220-n) is completed. If the power is shutdown during the operation of the application after the recording is completed (step S900), the actual recording into the recording area on the optical disc 100 for the "n"th time is not reflected in the space bit map information 120 on the memory 355 and in the management information recording area LI-2 on the optical disc 100, and "1" remains in the reliability flag 131. Thus, after the information recording/reproducing apparatus 300 is restarted, the operational flow goes through the step S102 and the step S103 in FIG. 8 described above, and it is judged to be No in the step S104. In the step S105a, only the space bit map information 120 corresponding to the P-area in which "1" remains in the reliability flag 131 is updated to the newest information in the management information recording area LI-2 on the optical disc 100. Incidentally, it is obvious that the normal updating of the space bit map information 120 and the reliability map information 130 before the power is shutdown on the information recording/reproducing apparatus 300 is effective.

Next, with reference to FIG. 10, a recording operation and an updating operation on the optical disc 100 in the normal case of the information recording/reproducing apparatus 300 will be explained. Incidentally, the recording operation from the step S200 to the step S220-n is the same as the case where the power is shutdown in FIG. 9.

In the normal case, after the recording into the recording area on the optical disc 100 for the "n"th time (the step S220-n) is completed, the updating is performed in the above-described step S230a, and "0" is placed into the reliability flag 131 corresponding to the P-area of interest in the above-described step S240a.

Then, the information recording/reproducing apparatus 300 waits for an instruction for ejecting the optical disc 100 from the operation button 310, i.e. an EJECT command (step S300). If the instruction for ejecting, i.e. the EJECT command, is issued (the step S300: Yes), the space bit map information 120 updated to the newest information on the memory 355 is rewritten or written once into the management information recording area LI-2 on the optical disc 100 (step S400).

Then, the reliability map information 130 is rewritten or written once in the same manner for confirmation (step S500).

Then, the information recording/reproducing apparatus 300 receives the issued instruction for ejecting the optical disc 100 from the operation button 310, i.e. the EJECT command, in the step S300, and actually ejects the optical disc 100 (step S600).

On the other hand, if the instruction for ejecting, i.e. the EJECT command, is not issued as a result of the judgment in the step S300 (the step S300: No), the information recording/reproducing apparatus 300 waits for the instruction for starting to record, i.e. the command of writing, to be issued (the step S200).

Figure 11:
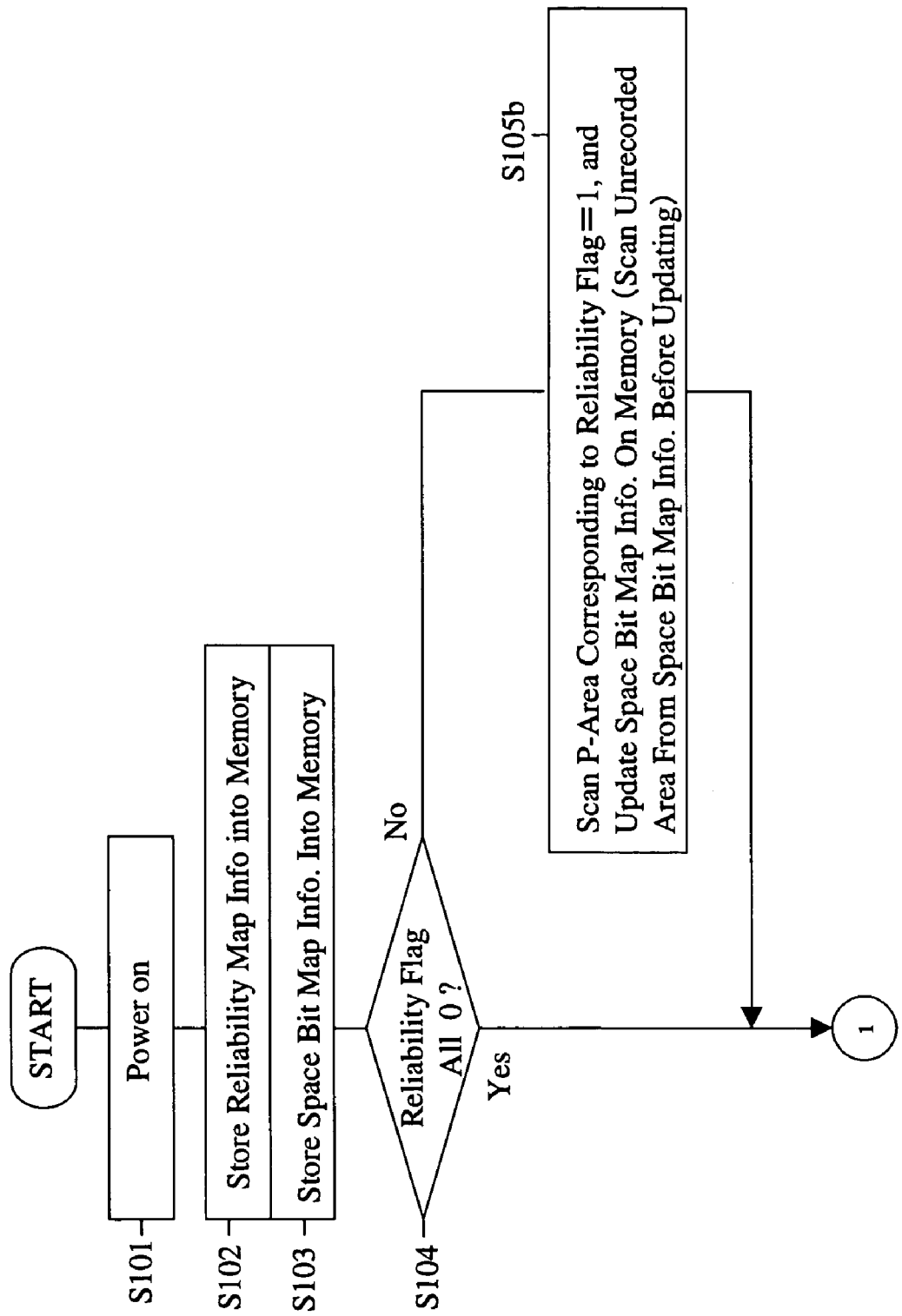
FIG. 11 is a flowchart showing such an operation that the space bit map information is updated on a nonvolatile memory on the basis of the reliability map information on the information recording/reproducing apparatus in the embodiment of the present invention.
Figure 12:
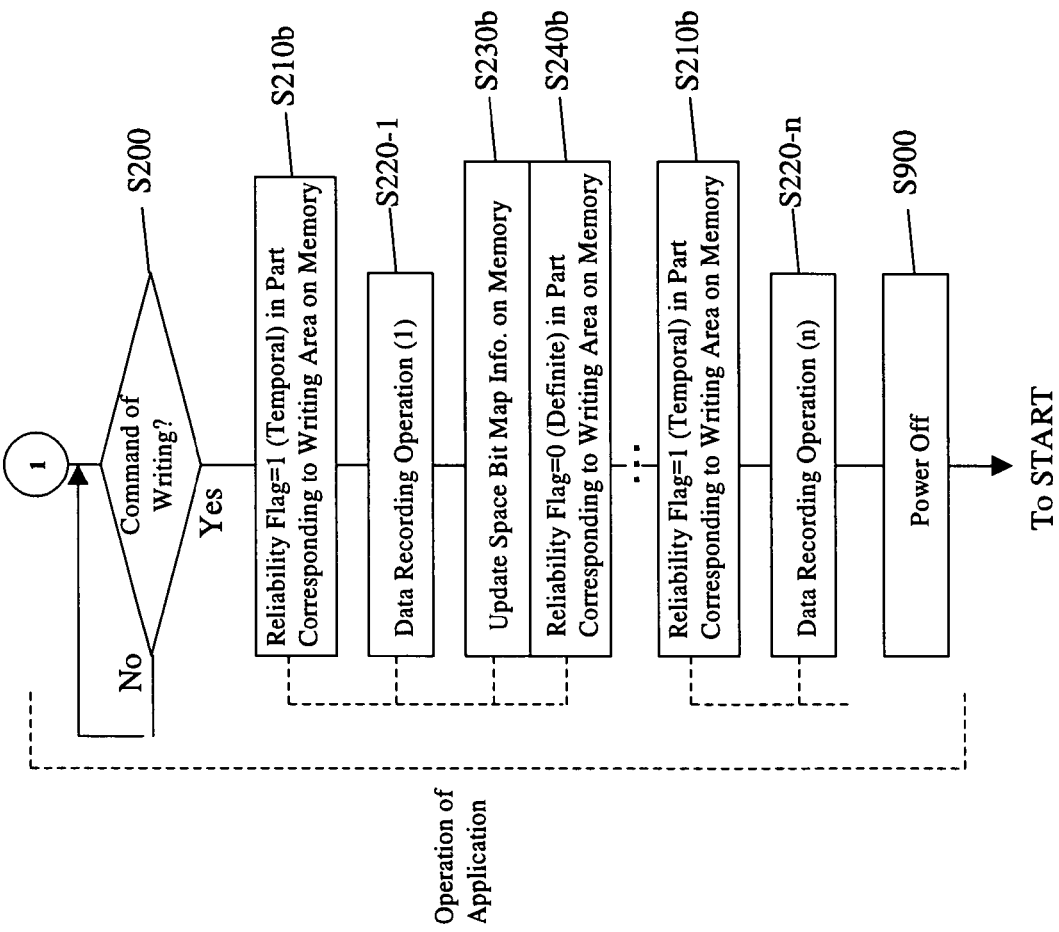
FIG. 12 is a flowchart showing a recording operation if power is shutdown in FIG. 11.
Figure 13:
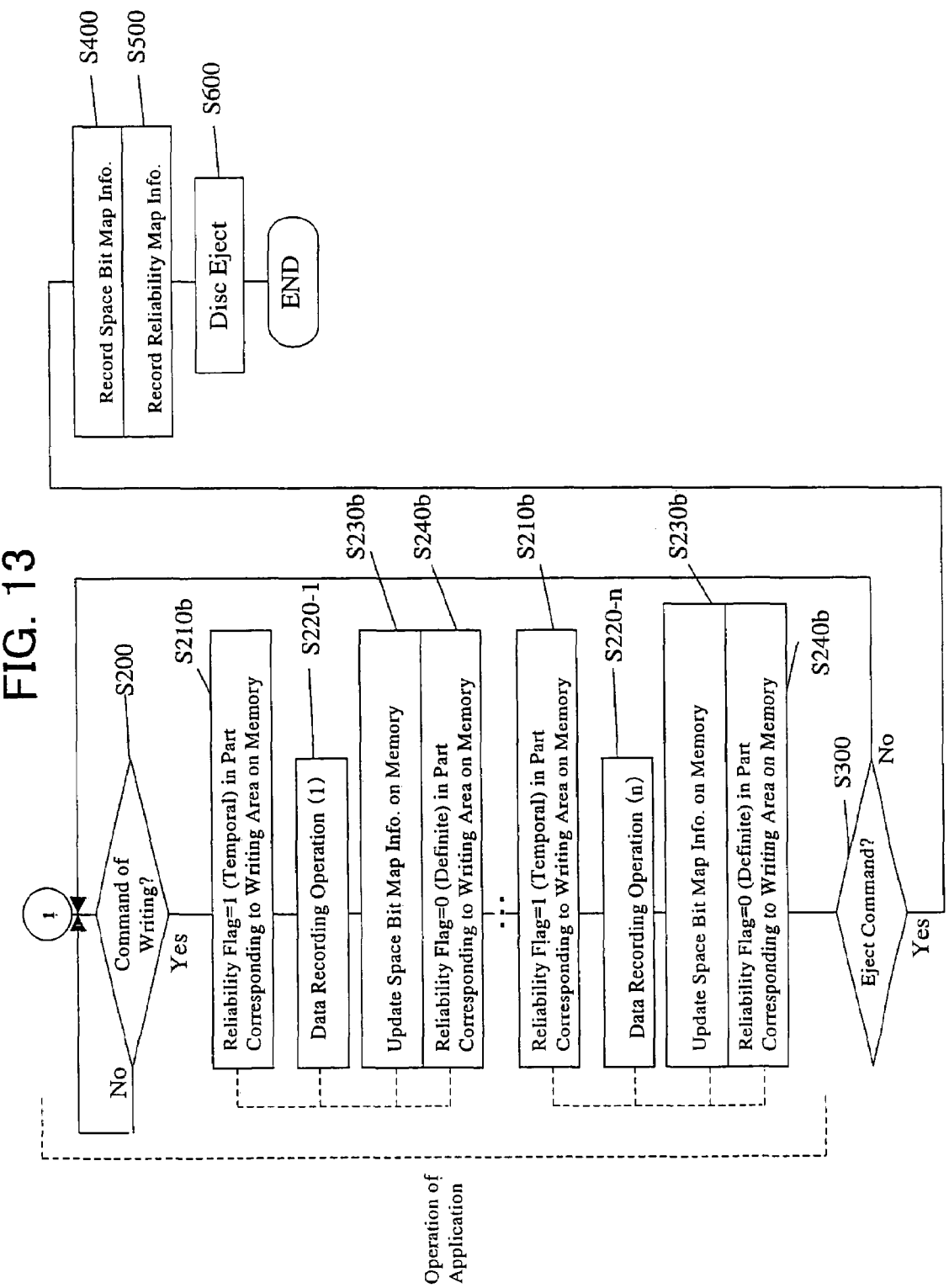
FIG. 13 is a flowchart showing a recording operation in the normal case in FIG. 11.

Next, in the case of having a non-volatile memory, such an operation that the space bit map information 120 is updated on the nonvolatile memory 355 on the basis of the reliability map information 130 and recording operations will be explained with reference to FIG. 11 to FIG. 13. FIG. 11 shows such an operation that the space bit map information 120 is updated on the nonvolatile memory 355 on the basis of the reliability flag 131 constructing the reliability map information 130 on the information recording/reproducing apparatus 300 in the embodiment. FIG. 12 shows a recording operation if the power is shutdown on the information recording/reproducing apparatus 300 in the embodiment. FIG. 13 shows a recording operation in the normal case on the information recording/reproducing apparatus 300 in the embodiment.

Firstly, with reference to FIG. 11, such an operation that the space bit map information 120 is updated on the nonvolatile memory 355 on the basis of the reliability flag 131 constructing the reliability map information 130 on the information recording/reproducing apparatus 300 will be explained. Incidentally, in FIG. 11, the same steps as those in FIG. 8, which shows another updating operation on the optical disc 100, carry the same reference numerals, and their explanations will be omitted as occasion demands.

The information recording/reproducing apparatus 300 judges whether or not the reliability flag 131 of the reliability map information 130 stored in the non-volatile memory 355 is all "0" (step S104). If "1" is placed in the reliability flag 131 corresponding to a certain P-area (the step S104: No), the space bit map information 120 is updated to the newest information on the memory 355 because the reliability of the space bit map information 120 corresponding to the P-area is low. Specifically, with respect to some P-areas in which "1" is placed in the reliability flag 131, scanning, i.e., reading is performed, and the "already recorded" recording area and the "unrecorded" recording area are judged. Moreover, the space bit map information 120 recorded on the non-volatile memory 355 is updated to the newest information (step S105b). Incidentally, upon scanning the recording area, it is efficient to preferentially scan the unrecorded area indicated in the space bit map information 120 before the updating, as described above.

Next, with reference to FIG. 12, a recording operation and an updating operation on the non-volatile memory 355 if the power is shutdown during the operation of the application on the information recording/reproducing apparatus 300 will be explained. Incidentally, in FIG. 12, the same steps as those in FIG. 9, which shows another updating operation on the optical disc 100, carry the same reference numerals, and their explanations will be omitted as occasion demands.

The processor 354 sets the recording area into which the data is recorded, i.e. written, on the basis of the space bit map information 120 stored in the non-volatile memory 355, and determines the address and the record data length of the recording area. "1" is temporarily placed into the reliability flag 131 corresponding to the P-area belonging to the recording area determined in this manner, which is on the non-volatile memory 355 (step S210b).

Then, the recording operation of the data is performed in the above-described step S220-1.

Then, the processor 354 which has received a command completion status distinguishes the "already recorded" recording area, and updates the space bit map information 120 on the memory 355 (step S230b). After the updating of the space bit map information 120 is completed, "0" is definitely placed into the reliability flag 131 corresponding to the P-area of interest, which is on the non-volatile memory 355 (step S240b).

Then, in the "n"th recording operation, "1" is temporarily placed into the reliability flag 131 corresponding to the P-area on the non-volatile memory 355 (step S210b), and the recording into the recording area on the optical disc 100 for the "n"th time (step S220-n) is completed. If the power is shutdown during the operation of the application after the recording is completed (step S900), the actual recording into the recording area on the optical disc 100 for the "n"th time is not reflected in the space bit map information 120 on the memory 355, and "1" remains in the reliability flag 131. Thus, after the information recording/reproducing apparatus 300 is restarted, the operational flow goes through the step S102 and the step S103 in FIG. 11 described above, and it is judged to be No in the step S104. In the step S105b, only the space bit map information 120 corresponding to the P-area in which "1" remains in the reliability flag 131 is updated to the newest information on the non-volatile memory 355. Incidentally, it is obvious that the normal updating of the space bit map information 120 and the reliability map information 130 before the power is shutdown on the information recording/reproducing apparatus 300 is effective.

Next, with reference to FIG. 13, a recording operation and an updating operation on the non-volatile memory 355 in the normal case of the information recording/reproducing apparatus 300 will be explained. Incidentally, the recording operation from the step S200 to the step S220-n is the same as that in the case where the power is shutdown in FIG. 12.

In the normal case, after the recording into the recording area on the optical disc 100 for the "n"th time (the step S220-n) is completed, the updating on the memory 355 is performed in the above-described step S230b, and "0" is definitely placed into the reliability flag 131 corresponding to the P-area of interest on the non-volatile memory 355 in the above-described step S240b.

The step S300, the step S400, the step S500, and the step S600 are the same as those in FIG. 10.

In the embodiment, the space bit map information 120 is taken for example and explained as the management information, but the management information may be another management information, such as defect list information, or may be information including all of them. Therefore, if the defect list information or the like is not updated to the newest information and it is judged to be unreliable, it is necessary to scan a P-area in which the defect list information or the like is recorded, as with the space bit map information 120, and the P-area required for the scanning is specified. Thus, it is possible to reduce a time length required for updating the defect list information or the like to the newest information.

In addition, the space bit map information 120 and the reliability map information 130, which are one example of the management information, are recorded into the management information recording area LI-2 and managed by the disc drive 300 under the control of the processor 354. The management information may be recorded into the user data areas UD and managed by a file system or an application or the like.

In the embodiment shown in FIG. 8 to FIG. 10, the rewritable optical disc 100 is explained as one example of the information recording medium, and a recorder or a player associated with the rewritable optical disc 100 is explained as one example of the information recording/reproducing apparatus. However, the present invention is not limited to the rewritable optical disc and the recorder or the player for it. Using the embodiment shown in FIG. 11 to FIG. 13, the present invention can be applied to: a write-once-type information recording medium, such as a write-once-type optical disc; a large capacity recording apparatus, such as a hard disk; other various information recording media for high density recording or high transfer rate; and a recorder or a player for the media.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-197334 filed on Jul. 15, 2003 including the specification, claims, drawings and summary is incorporated herein by reference in its entirety.

What is claimed is:

1. An information recording medium comprising:
a recording area divided into a plurality of partial areas in advance; and
an information area for recording therein (i) management information for managing recording conditions of the plurality of partial areas at least for each of the plurality of partial areas and (ii) reliability information for indicating reliability of the management information for each of the plurality of partial areas.

2. The information recording medium according to claim 1, wherein said information area is placed in a lead-in area of said recording area.

3. The information recording medium according to claim 1, wherein the management information comprises information for indicating whether or not data is recorded for each of small areas, which are obtained by further dividing each of the plurality of partial areas into a plurality of the small areas.

4. The information recording medium according to claim 1, wherein the management information and the reliability information are described in a table format for each of the plurality of partial areas.

5. An information recording apparatus for recording data onto an information recording medium comprising: a recording area divided into a plurality of partial areas; and an information area for recording therein (i) management information for managing recording conditions of the plurality of partial areas at least for each of the plurality of partial areas and (ii) reliability information for indicating reliability of the management information for each of the plurality of partial areas,
said information recording apparatus comprising:
a reading device for reading the management information from said information area;
a determining device for determining at least one of the plurality of partial areas, which is managed by the management information read by said reading device, as a data recording-area for recording the data;
a first updating device for temporarily updating the reliability information, which corresponds to the management information for managing the determined data-recording-area, to information for indicating to be unreliable;
a recording device for recording the data into the determined data-recording-area; and
a second updating device for updating the management information after recording of the data is completed and for definitely updating the reliability information, which corresponds to the updated management information, to information for indicating to be reliable.

6. An information recording method of recording data onto an information recording medium comprising: a recording area divided into a plurality of partial areas; and an information area for recording therein (i) management information for managing recording conditions of the plurality of partial areas at least for each of the plurality of partial areas and (ii) reliability information for indicating reliability of the management information for each of the plurality of partial areas,
said information recording method comprising:
a reading process of reading the management information from said information area;
a determining process of determining at least one of the plurality of partial areas, which is managed by the management information read by said reading process, as a data-recording-area for recording the data;
a first updating process of temporarily updating the reliability information, which corresponds to the management information for managing the determined data-recording-area, to information for indicating to be unreliable;
a recording process of recording the data into the determined data-recording-area; and
a second updating process of updating the management information after recording of the data is completed and of definitely updating the reliability information, which corresponds to the updated management information, to information for indicating to be reliable.

7. The information recording medium according to claim 1, wherein there are 16 partial areas.

8. The information recording medium according to claim 1, wherein the information recording medium from an inner side to an outer side, includes a lead-in area containing partial areas LI-1, LI-2, LI-3 and LI-4, a data zone containing partial areas SA-1, UD-1, UD-2, UD-3, UD-4, UD-5, UD-6, UD-7, UD-8 and SA-2, and a lead out area containing partial areas LO-1 and LO-2.

9. The information recording medium according to claim 8, wherein data zone includes a user data area containing the partial areas UD-1, UD-2, UD-3, UD-4, UD-5, UD-6, UD-7 and UD-8.

10. The information recording medium according to claim 8, wherein the reliability information is reliability map information recorded into partial area LI-2.

11. The information recording medium according to claim 1, wherein the reliability map information is information that a plurality of first flag information for indicating reliability of whether or not a space bit map information corresponding to each of the partial areas is updated to a newest information, are combined with respect to all of the partial areas.

* * * * *

UNITED STATES PATENT AND TRADEMARK OFFICE
CERTIFICATE OF CORRECTION

PATENT NO.      : 7,599,258 B2                                    Page 1 of 1
APPLICATION NO. : 10/891123
DATED           : October 6, 2009
INVENTOR(S)     : Yoshida et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1451 days.

Signed and Sealed this

Twenty-eighth Day of September, 2010

David J. Kappos
*Director of the United States Patent and Trademark Office*